US006917951B2

(12) United States Patent
Orbits et al.

(10) Patent No.: US 6,917,951 B2
(45) Date of Patent: Jul. 12, 2005

(54) SYSTEM AND METHOD FOR REPLICATING DATA IN RESOURCE SETS

(75) Inventors: David A. Orbits, Redmond, WA (US); Praerit Garg, Kirkland, WA (US); Sudarshan A. Chitre, Redmond, WA (US); Balan Sethu Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/917,261

(22) Filed: Jul. 26, 2001

(65) Prior Publication Data

US 2003/0023618 A1 Jan. 30, 2003

(51) Int. Cl.[7] .............................................. G06F 17/30
(52) U.S. Cl. ........................ 707/203; 707/202; 707/200
(58) Field of Search ................................. 707/200–205, 707/104, 102; 709/220; 705/52; 717/170, 168

(56) References Cited

U.S. PATENT DOCUMENTS

| 5,664,098 A | * | 9/1997 | Bianchi et al. ............. 713/200 |
| 5,787,247 A | * | 7/1998 | Norin et al. ................ 709/220 |
| 6,353,926 B1 | * | 3/2002 | Parthesarathy et al. ..... 717/170 |
| 2001/0010046 A1 | * | 7/2001 | Muyres et al. ................ 705/52 |

OTHER PUBLICATIONS

Windows 2000 Resource Kits, "Introduction to FRS," *File Replication Service*, pp. 1–3, Aug. 31, 2000.

Windows 2000 Resource Kits, "How FRS Works," *File Replication Service*, pp. 1–4, Aug. 31, 2000.

* cited by examiner

*Primary Examiner*—Charles Rones
*Assistant Examiner*—Neveen Abel-Jalil
(74) *Attorney, Agent, or Firm*—Merchant & Gould P.C.

(57) ABSTRACT

Described is a system and method for replicating each of a set of resources to a subject computer in a replica set prior to making use of a resource in the set of resources. The set of resources includes resources that are dependent upon each other for a proper functioning of the group. A manifest file that identifies each resource in a group of interrelated resources is used. The manifest file is generated at one computer in the replica set (typically the computer at which a modification to one of the interrelated resources occurred). When the modification occurs to one of the set of resources, the manifest file is transmitted (e.g., itself replicated) to each computer in the replica set. The manifest file includes an indicator that identifies the manifest file as a special file. When received at another computer in the replica set, a service evaluates the manifest file to identify whether the appropriate versions of the identified resources exist at the receiving computer. If not, the service at that computer awaits the receipt of each resource. The wait period may include delaying the execution of an application associated with (or even included within) the manifest file from launching. Alternatively, the FRS could simply disallow access to one or more resources identified in the manifest file until all have arrived. When all have arrived, the FRS releases control of the identified resources, which may then operate or be accessed in the ordinary manner.

10 Claims, 6 Drawing Sheets

SYSTEM AND METHOD FOR REPLICATING DATA IN RESOURCE SETS

TECHNICAL FIELD

The present invention relates to network-managed file systems. More particularly, the present invention relates to a file replication service for use in a networked computing environment.

BACKGROUND OF THE INVENTION

The File Replication Service (FRS) pertains to the process of copying data from one computer to another over a network such that an identical data set is stored on each of the computers in the network. The network of computers sharing the replicated files is termed a "replica set." FRS enhances file availability and file sharing by duplicating shared files. However, FRS does not guarantee the order in which files are duplicated at each computer. Files begin replication in sequential order based on when a changed file is closed, but file size and link speed determine the order of completion. In many instances, a group of files or data may be interrelated such that a proper functioning of any one file in the group is dependent on all the files existing and being current on a machine. In one example, an application program may include several files that are necessary to run the application. Given the latency of replicating all the necessary files, a user may attempt to launch the application before the FRS has had time to fully replicate all the necessary files to the particular computer in the replica set on which the application is being launched. The likely result is that the application would run unreliably or not run at all. Until now, there has been no solution to that problem.

SUMMARY OF THE INVENTION

Briefly stated, the present invention provides a system and method for ensuring that each of a set of resources has been replicated to a subject computer in a replica set prior to making use of a resource in the set of resources. In one aspect, the present invention provides a manifest file that identifies each resource in a group of interrelated resources. The group of interrelated resources includes resources that are dependent upon each other for a proper functioning of the group. In one example, an application program may require that the most current version of two separate files both exist on the computer or the application program may operate unreliably. The manifest file is generated at one computer in the replica set (typically the computer at which a modification to one of the interrelated resources occurred). When the modification occurs to one of the interrelated resources, the manifest file is first transmitted (e.g., itself replicated) to each computer in the replica set. The manifest file includes an indicator that identifies the manifest file as a special file. When received at another computer in the replica set, the FRS evaluates the manifest file to identify whether the appropriate versions of the identified resources exist at the receiving computer. If not, the FRS at that computer awaits the receipt of each resource. The wait period may include disallowing an application associated with (or even identified in) the manifest file from launching. Likewise, the FRS may simply disallow access to one or more resources identified in the manifest file until all have arrived. When all have arrived, the FRS releases control of the identified resources, which may then operate or be accessed in the ordinary manner.

In another aspect of the invention, the manifest file is secured by including with the manifest the security context of the user that created the manifest file. When the manifest file is received at a receiving member of the replica set, the FRS creates a new process in which to execute an application associated with the manifest file. The new process is given the same security context as that included with the manifest file. This aspect prevents the situation where a malicious user circumvents his own security constraints by creating a manifest file that causes an application to execute in and exploit a less-constrained process on another member of the replica set.

DETAILED DESCRIPTION OF THE INVENTION

Illustrative Operating Environment

Figure 1:
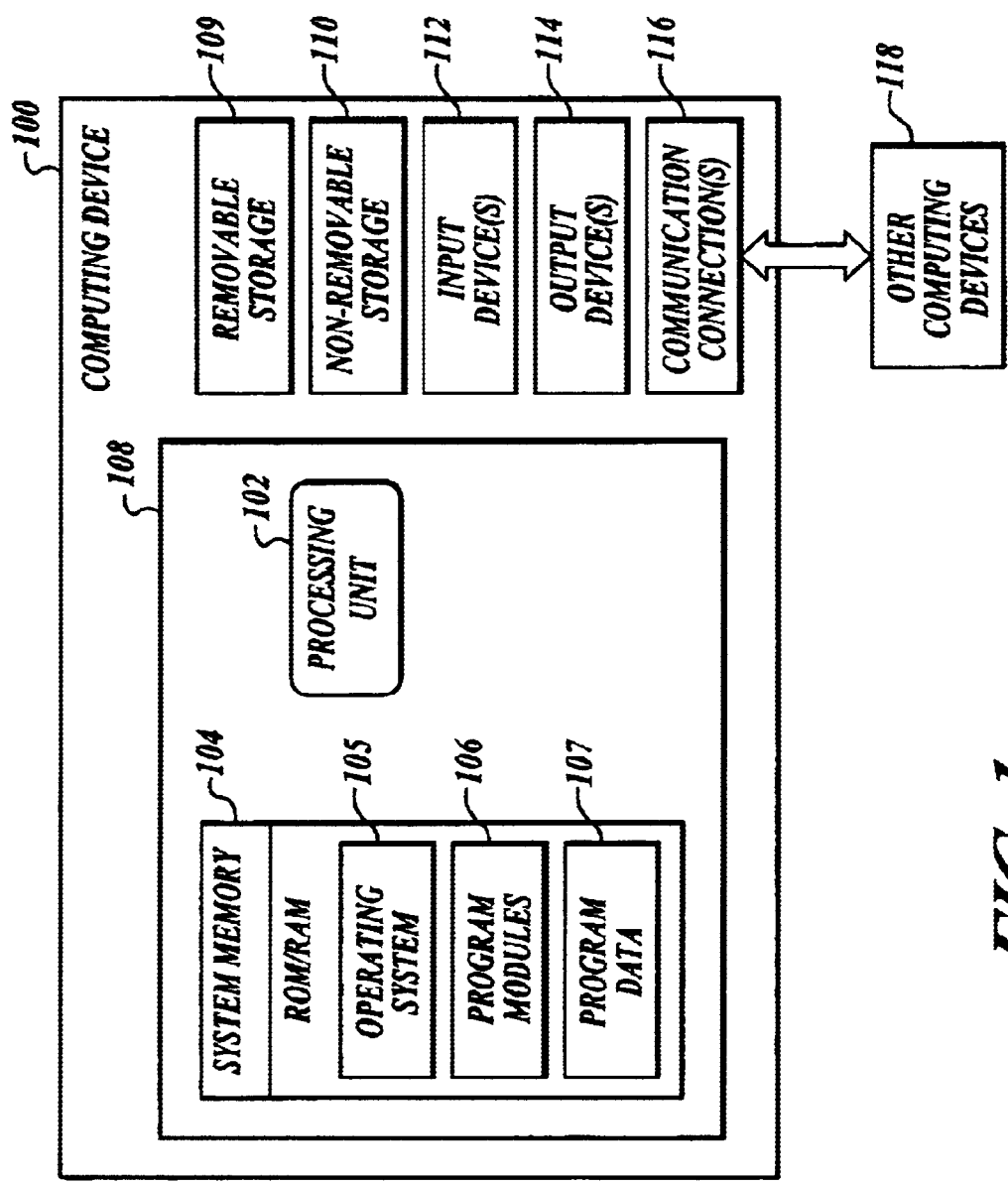
FIG. 1 is a functional block diagram of one computing device which may be adapted to embody one implementation of the present invention.

With reference to FIG. 1, an exemplary system for implementing the invention includes a computing device, such as computing device 100. In its most basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are well know in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
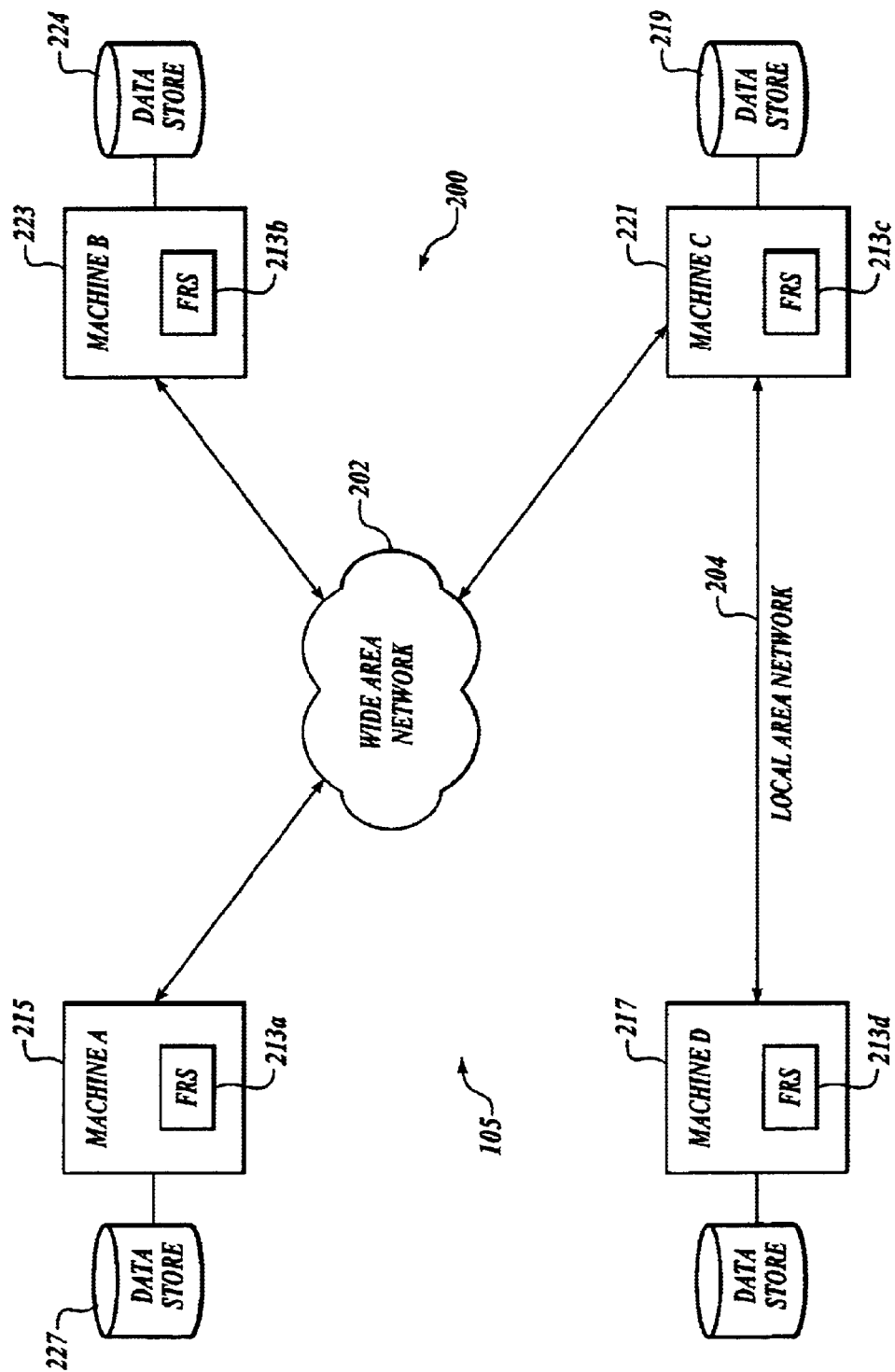
FIG. 2 is a functional block diagram illustrating an overview of a networked environment in which a file replication system according to the present invention may be implemented.

FIG. 2 is a functional block diagram illustrating an overview of a networked environment 200 in which a file replication system according to the present invention may be implemented. Illustrated are a number of computing systems, each one similar to the computing device 100 described above, connected together over either a wide area network 202 or a local area network 204. The Internet is one example of a wide area network 202 that may be suitable for use in conjunction with the networked environment 200. The several computing systems include Machine A 215, Machine B 223, and Machine C 221 connected to communicate over the wide area network 202. In addition, Machine D 217 is connected to communicate with Machine C 221 over the local area network 204. Although illustrated and described here in the context of networked computing systems, it will be appreciated that some offline mechanism could be used, although not preferably, to transfer files and information between the several computing systems, such as through the use of a backup tape or CD-ROM device.

As is known in the art, each of the several computing systems may communicate with each other through well known networking protocols and devices to share resources, such as files and printers. For instance, a file stored on a data store 219 at Machine C 221 may be made accessible to Machine A 215 over the wide area network 202 or to Machine D 217 over the local area network. Over and above those well known networking mechanisms, each of the computing systems also includes a File Replication Service (FRS) 213. The FRS 213 allows a portion of a data store, such as a file or directory, to be replicated to one or more of the computing systems. For instance, data store 219 may be identified as shared with one or more of the other computing systems in the networked environment 200. In addition, data store 219 may be configured to be replicated by the FRS 213 to each of the computing systems with which the portion is shared. Each of the computing systems with which data store 219 is shared is called a replication partner. The group of replication partners is called a replica set. For the purpose of this discussion only, the termed "shared" refers to resources that are both shared and identified for replication. For illustrative purposes only, each data store illustrated in FIG. 2 is assumed to be shared with each computing system in the networked environment 200. Those skilled in the art will appreciate that each computing system may include additional data storage that is not shared, or that each data store may be shared with fewer than all the computing systems in the networked environment 200. Moreover, each data store may be shared with other computing systems through non-networked mechanisms, such as CD-ROM or tape media, and it is not a requirement of the invention that the several computing systems each be "shared" in the conventional networked sense.

To achieve replication, the FRS 213 essentially operates as follows. A data store, which may be a directory or folder, is shared with each replication partner, which may be all or a subset of the computing systems in the networked environment 200. In that way, the resources (e.g., files) within the shared portion are available to each replication partner. If a resource within the shared data store is modified at any replication partner, the FRS 213 at that replication partner notes the modification and issues a notification to each of the other replication partners of the change. The replication partners may then accept the notification (or not based on certain criteria) and request that the modified resource be copied to the data store local to each replication partner.

For example, assume that each computing system in the networked environment 200 is a replication partner with respect to the shared data stores. If a file within the data store 227 at Machine A 215 is modified, the FRS 213 at Machine A 215 issues a notification of the change to each replication partner. A replication partner, such as Machine B 223, may accept the notification and copy the modified file from the data store 227 of Machine A 215 to the data store 224 at Machine B 223. Each of the other replication partners may also accept the notification and copy the file to their local data store. In that way, the modified file becomes replicated to each replication partner, and the modifications to the file are reflected at each replication partner.

In many instances, the several data stores may include replicas of a group of files or data that are interrelated such that a proper functioning of any one file in the group is dependent on all the files existing and being current within the data store. To better illustrate that situation, referring now to FIG. 3, one instance of the several data stores (e.g., data store 219 at Machine C 221) is illustrated. Data store 219 contains several separate resources, each of which is replicated (via the FRS 213a–d) to the data stores of each of the replication partners. A group of the several resources may together form an application 317. Each of the resources within the application 317 may be necessary for a proper and complete functioning of the application. In addition, if the versions differ between one or more of the resources within the application 317, unpredictable execution of the application 317 may result.

The application 317 may occasionally be modified, such as if the application 317 is upgraded or if data is changed. The modification is likely to result in changes to many of the resources (e.g., file 321 and file 323) within the application 317. In that situation, each replica of the application 317 at the several replication partners should include both modified file 321 and modified file 323 for a proper functioning of the application 317. However, given the latency of replicating resources within a networked environment, it is highly possible that one resource (e.g., file 321) becomes replicated to a replication partner before other resources (e.g., file 323). If a user attempts to launch the application 317 at the replication partner in the time between the first file 321 being replicated and the second file 323 being replicated (e.g., when only the current version of file 321 exists at the replication partner), application 317 may operate in an unpredictable and unstable manner.

This embodiment of the invention addresses that problem by including a manifest file 325 that describes a group of resources, such as the resources of application 317, that form a resource group. The resource group defines a set of resources that should each be present before any of the resources in the set is available for access. The manifest file 325 may identify each of the resources in the resource group including proper version information. A resource may also be part of more than one manifest file.

Figure 4:
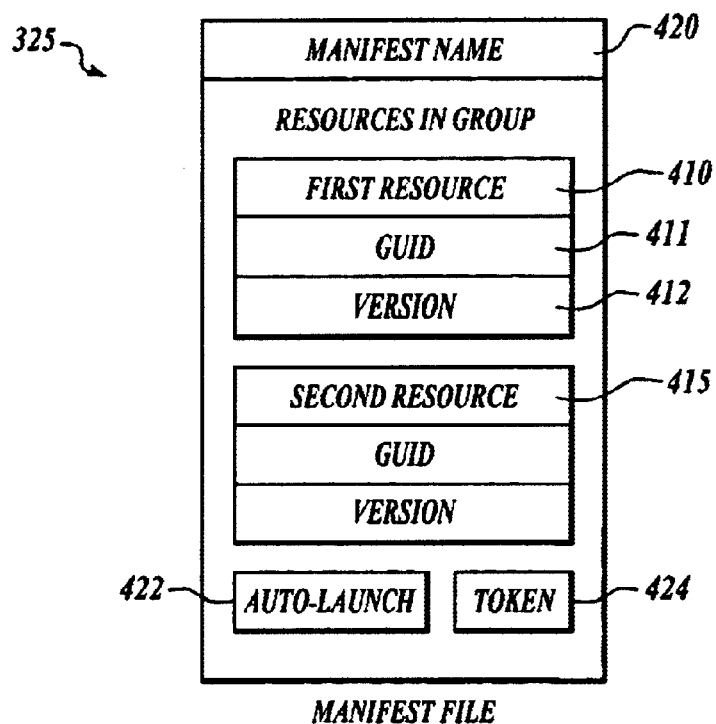
FIG. 4 is a functional block diagram illustrating one example of a manifest file identifying a resource group that may be used in one implementation of the present invention.

FIG. 4 is a functional block diagram illustrating one example of information that may be included within the manifest file 325 to define a resource group. The manifest file 325 may be created as a part of upgrading the application (or at any other time) through the use of certain application programming interface (API) calls made available by an FRS system 500 (described below in conjunction with FIG. 5). The API calls may include a CreateManifest function that allows a process (e.g., an application, a user process, or any other process) to create an empty manifest file 325. Once created, an AddToManifest function may allow the process to add identifiers to the manifest file 325 for each resource in the resource group, such as a First Resource 410 and a Second Resource 415. Each resource identifier may include a globally-unique identifier (GUID) 411 and a version identifier 412 for the particular version of the resource that has been modified. When the process has completed adding identifiers for resources to the manifest file 325, the process may close the manifest file 325, causing the FRS system 500 (FIG. 5) to issue a change order regarding the manifest file 325. Change orders are also described below in connection with the FRS system 500 illustrated in FIG. 5. Closing the manifest file 325 may also cause it to be issued a GUID. The manifest file 325 may also include an expiration time that identifies how much time is allowed to replicate the entire resource group.

In this embodiment, during the creation of the manifest file 325, the process can call a function to include a special indicator (auto-launch 422) that is interpreted by the FRS system as an instruction to automatically execute the resource group when it is completely replicated. The function causes the FRS system to capture the login credentials (e.g., a security "token") of the process creating the manifest. These credentials are then included in the manifest file 325 as a token 424 for use when the resources are executed, as will be described later. In this way, a malicious process is prevented from creating a malicious application, such as a virus, and spreading the malicious application to other replication partners. In the absence of this safeguard, the resources could be made to automatically execute in an administrative or system process and thereby circumvent the security safeguards attached to the malicious process. With the advantages of this feature, when the malicious application is executed on a replication partner, it will have no more permissions than those had by the process that created the manifest file.

Figure 5:
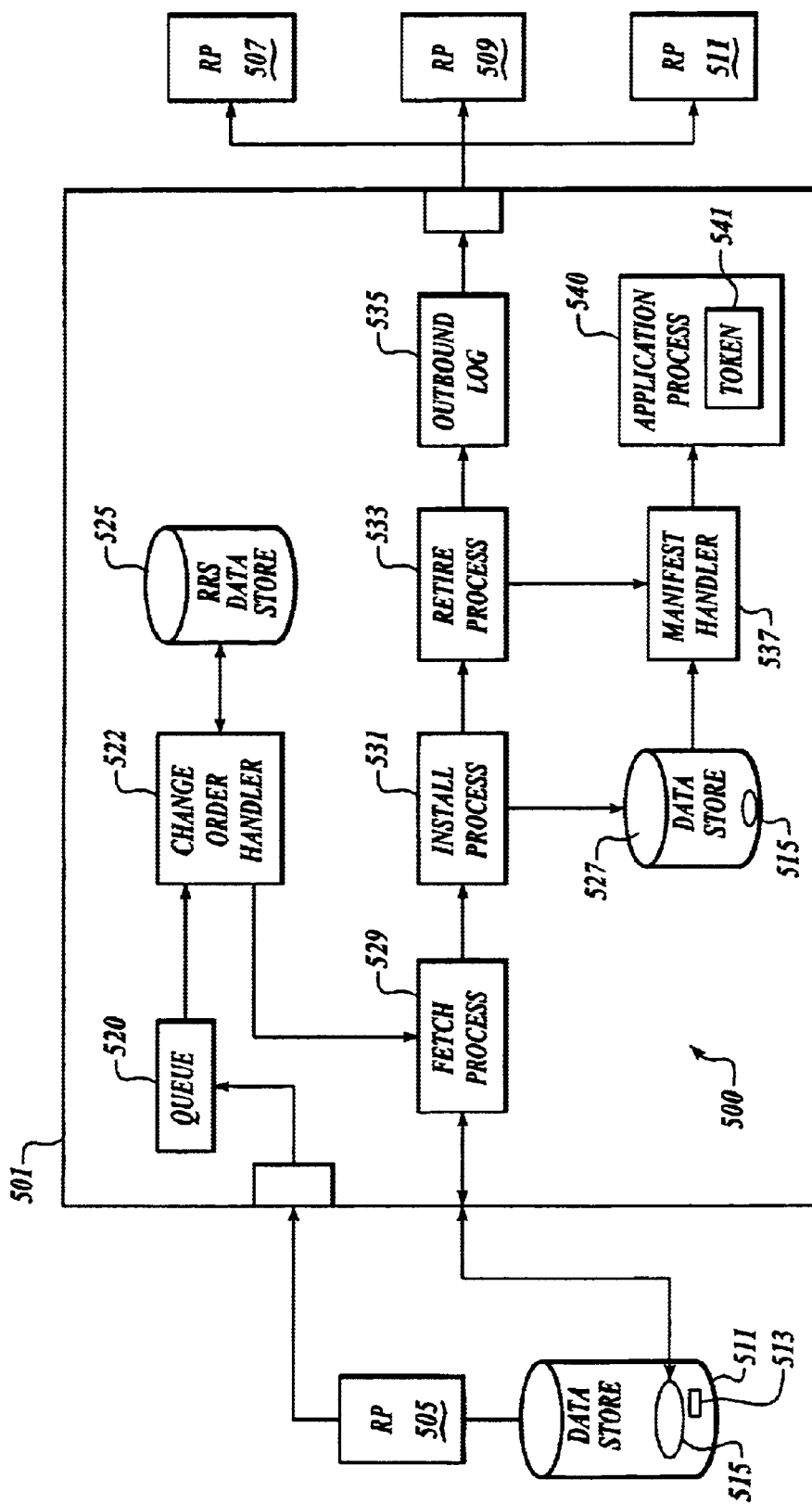
FIG. 5 is a functional block diagram illustrating in detail components that may be employed by a File Replication Service system to replicate resources to each replication partner, in accordance with one implementation of the present invention.

FIG. 5 is a functional block diagram illustrating in greater detail components that may be employed by an FRS system 500 to replicate resources to each replication partner. The FRS system 500 makes use of manifest files to ensure that resources in a replica group are all available before launching the resources in the replica group. Shown in FIG. 5 are several replication partners in a replica set, such as replication partner (RP) 505, RP 507, RP 509, and RP 511. Each of those replication partners is in communication with RP 501. Systems similar to the FRS system 500 (shown expanded within RP 501) also reside at each of the other replication partners that communicate with RP 501. RP 501 may be any of the computing systems shown in the networked environment illustrated in FIG. 2.

Figure 3:
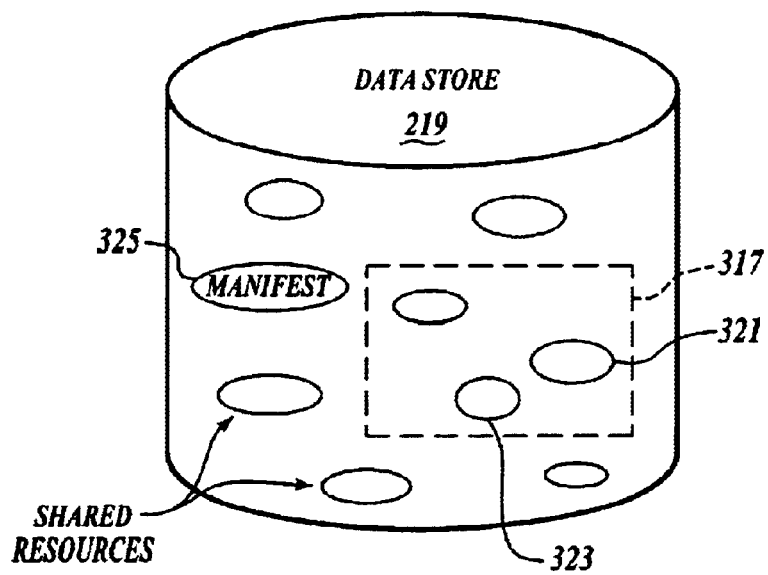
FIG. 3 is a functional block diagram of a shared data store that may be used in one implementation of the present invention.

The components and operation of this embodiment of the invention are best described through the following example. Several resources are replicated across the replica set containing RP 501, RP 505, RP 507, RP 509, and RP 511, and thus exist within a data store at each replication partner, such as data store 511 at RP 505. Included in those resources is an application having a resource group 513, similar to application 317 (FIG. 3). Although in this example the application already exists at each replication partner, this embodiment of the invention is equally applicable to situations where an application is first added to the data store at one replication partner and does not yet exist at other replication partners, as will become more clear later.

Continuing with the example, the application is upgraded or otherwise modified at RP 505, resulting in multiple modified files within the resource group 513. A manifest file 515 has been created in conjunction with the modifications to the application and in accordance with the discussion above regarding FIG. 4. The manifest file 515 identifies each resource in the resource group 513 and the versions of those resources. Thus, when the resources of the application are modified, the FRS system resident at RP 505 notes the modification and creates a "change order" message.

Figure 6:
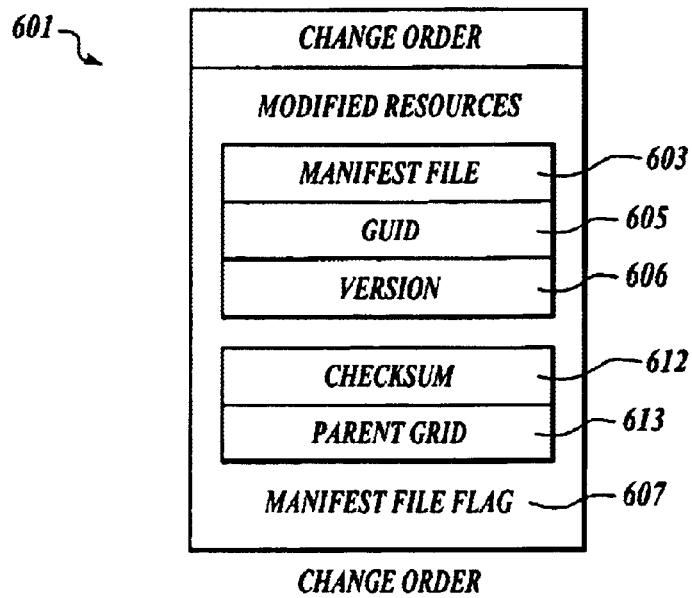
FIG. 6 is a functional block diagram generally illustrating one example of a change order that may be used in an implementation of the present invention to indicate that a manifest file has been created at one replication partner.

Referring briefly to FIG. 6, which illustrates one example, the change order 601 is a message indicating that resources within the data store 511 have changed and should be replicated to each of the replicating partners. The change order 601 includes a resource name 603 and a resource globally unique identifier (GUID) 605 uniquely identifying the resources that are affected by the change order 601 (the manifest file 515 in this instance) and a version identifier 606. In addition, the change order 601 includes a flag 607 that indicates to the FRS system 500 that the change order 601 involves a manifest file, which is a special file to the FRS system 500. The change order 601 may optionally include other information useful to the FRS system 500, such as a checksum 612 of the contents of the manifest or a parent GUID 613 for the resources identified in the change order 601.

Figure 7:
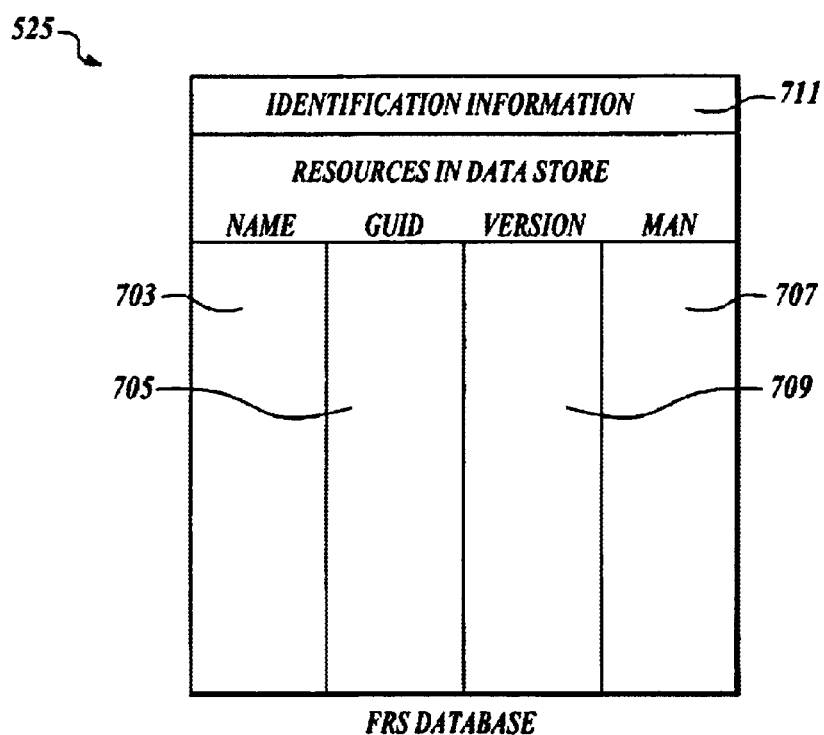
FIG. 7 is a functional block diagram generally illustrating a database of locally stored resources that may be used in one implementation of the present invention.

Returning to FIG. 5, when the change order has been created, the RP 505 passes it to each of the other replication partners, such as RP 501. In one embodiment, passing the change order may take the form of issuing a remote procedure call (RPC) to the RP 501 to handle the change order. When received at the RP 501, the change order is stored in a process queue 520 to await handling. A change order handler 522 is informed that the change order has arrived and retrieves the change order from the queue 520. The change order handler 522 compares the resources identified in the change order to information contained in a FRS database 525. Referring briefly to FIG. 7, the FRS database 525 is a file or other resource that includes information identifying each of the several resources within the local data store 527. Each resource may be identified by name 703, by GUID 705, and by version 709. In addition, the FRS database 525 may include a flag 707 that identifies whether each resource is a manifest file. Optionally, other identification information may be included.

Returning again to FIG. 5, the change order handler 522 compares the change order to the FRS database 525 to determine whether the resources identified in the change order are interesting to the FRS system 500. For instance, if the change order identifies a resource having a particular version, and that version of the resource is already identified in the FRS database 525 (meaning that the modified resource already exists locally), then the change order handler 522 may reject the change order. Rejecting the change order may involve simply doing nothing more, notifying the sending party that the change order was rejected, or may involve retiring the change order (described later) without retrieving the resources.

In this example, the change order identifies a resource (the manifest file 515) which does not exist in the local data store 527. Accordingly, the change order handler 522 accepts the change order, such as by issuing an acceptance reply to the RP 505, and proceeds to replicate the manifest file 515. The change order handler 522 may instruct a fetch process 529 to retrieve the manifest file 515 from RP 505. Using conventional network file transfer mechanisms, the fetch process 529 retrieves the manifest file 515 from the RP 505 and passes it to an install process 531 that stores the manifest file 515 to the local data store 527. The install process 531 also updates the FRS database 525 to reflect that the manifest file 515 is now stored at the local data store 527. In addition, the change order handler 522 may compute a checksum for the manifest file and compare it to the checksum 612 stored in the change order to determine if the contents have changed, and if so, rejecting the change order.

At this point, the manifest file 515 has been identified as being such and has been retrieved from RP 505. The install process 531 then passes the change order to a retire process 533 to be retired. Retiring the change order involves marking the change order as handled and storing the change order in an outbound log 535 for dissemination to other replication partners (e.g., RP 507, RP 509, RP 511). In addition, the retire process 533 notes that the change order refers to a manifest file (by the manifest file flag 607) and passes the change order to a manifest handler 537 or otherwise notifies the manifest handler 537 of the existence of the manifest file 515 on the local data store 527.

The manifest handler 537 retrieves the manifest file 515 from the local data store 527 and compares the list of resources identified in the manifest file 515 with the resources identified in the FRS database 525. That comparison allows the manifest handler 537 to determine which resources identified in the manifest file 515 have already been replicated and which resources remain to be replicated. The manifest handler 537 may periodically query the FRS database 525 to determine when all the identified resources have arrived, or, alternatively, may register to be notified each time a change is made to the FRS database 525. Until the manifest handler 537 determines that all identified resources have arrived, it may lock access to each of the resources identified in the manifest file 515. More likely, the manifest handler 537 may simply delay making the resources associated with the manifest file 515 readily available for execution, such as by delaying the execution of an installation file or script or by not updating a system registry until all the resources have arrived. In this way, different versions of the resources within the resource group will not be accessed until the resource group has been completely replicated.

Eventually, the resource group is complete, and the manifest handler 537 makes the several resources in the resource group available for execution or other access at RP 501. If the manifest file 515 was created with instructions to execute when the resource group is complete (as described above), the manifest handler 537 may execute the resource group in an application process 540 created with the token 541 identified in the manifest file 515. As mentioned above, this security safeguard prevents a malicious network user from creating a manifest file describing a resource group that includes a virus that will self-execute on each replication partner that receives the manifest file.

Additional computers can be added to the replica set at any time. When this occurs, the new member computer does an initial sync with its specified inbound partner. As part of this sync, the new member computer receives any manifest files and, if they are not expired, the normal processing is performed. This has the benefit that existing manifests from installed applications which have not otherwise expired will cause that related application to get installed simply by adding the new member computer to the replica set without further administrative action is required.

Figure 8:
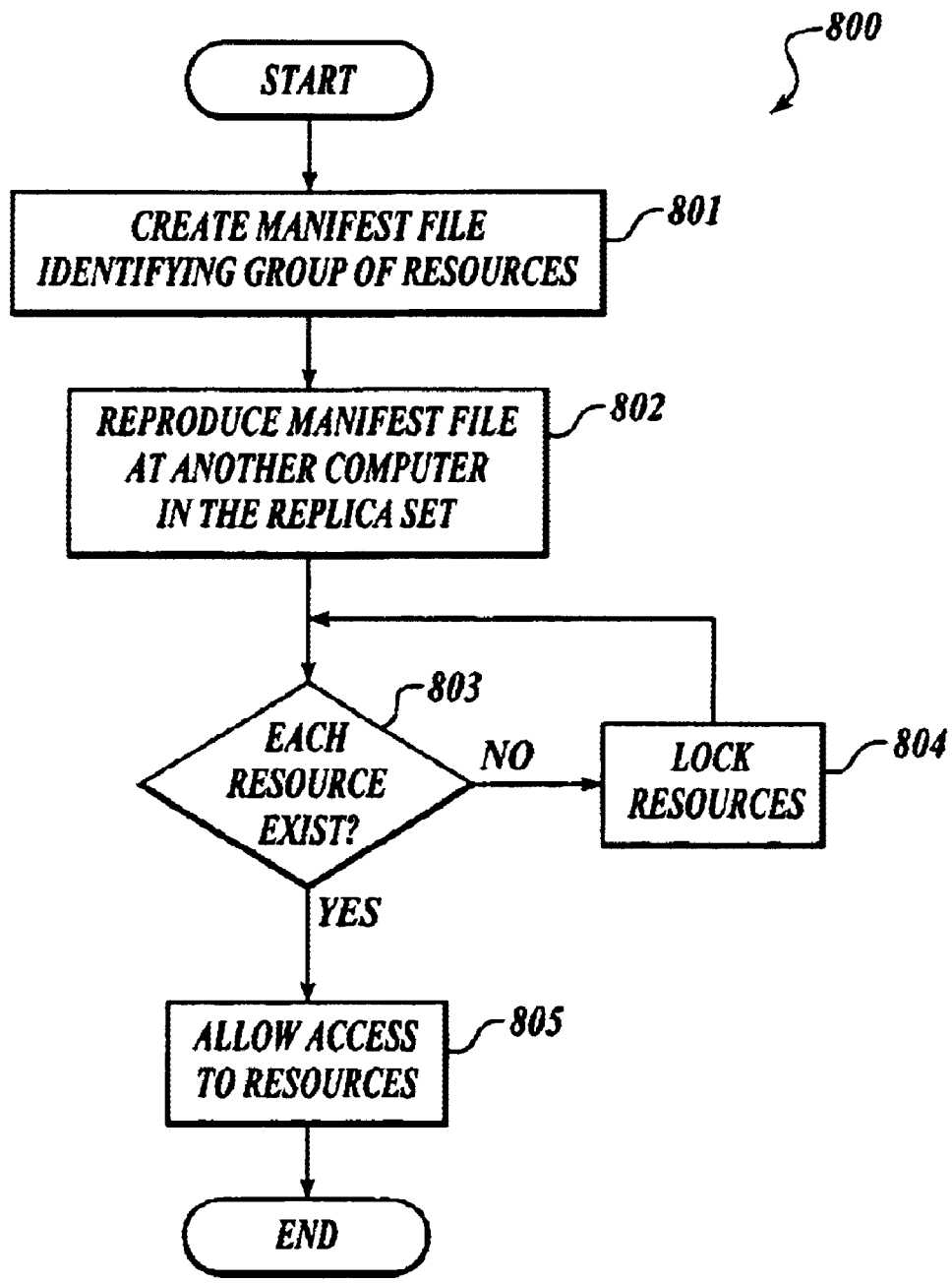
FIG. 8 is a logical flow diagram generally illustrating a process for replicating data from a first member of a replica set to a second member of a replica set, in accordance with one implementation of the present invention.

FIG. 8 is a logical flow diagram generally illustrating a process for replicating data from a first member of a replica set to a second member of a replica set. The process begins with multiple members of a replica set sharing resources in a shared data store, and a resource group has been modified at a first member of the replica set. The process begins at block 801.

At block 801, a manifest file is created at the first member of the replica set. The manifest file includes an identifier for each resource in the resource group at the first replica set member. Additionally, the manifest file may include GUIDs for each identified resource, or version identifiers for each resource, or both. One particular embodiment may include additional options in the manifest file. For instance, a LAUNCH-EQ option, a LAUNCH-GE option, and a LAUNCH-FAIL option may be available. Each could be included in the manifest file and identify a file name of an application or script to run. LAUNCH-EQ would cause the associated application to be launched only if resource version levels and conditions are met exactly as identified in the manifest file. LAUNCH-GE would cause the associated application to launch if the conditions are met or if the resource version levels on the given computer are greater than those specified in the manifest. LAUNCH-FAIL would cause the associated application to be launched if LAUNCH-GE was not specified and the resource version levels are higher than specified in the manifest or other required manifest conditions are not satisfied.

A manifest may have other required conditions which, because of unforeseen changes in the replicated environment, make it inappropriate to launch the associated application. For example, the application may be expecting a particular file to be deleted but other changes in the environment have caused that particular file to be "reanimated," such as through last-writer-wins semantics. In that case, the manifest conditions would never be met and the app associated with the LAUNCH-FAIL directive should be executed. The application might be a notification to the manifest submitter that the manifest failed to complete on the given computer.

Each resource listed in the manifest file could also contain a predicate that must be satisfied in addition to the version level. Once the version level test passes, this predicate must also be satisfied for the manifest to succeed. For example, four such predicates might be that the associated resource MUST-BE-DELETED, MUST-BE-PRESENT, ANY-VERSION-ALLOWED, or MAY-BE-MISSING.

At block 802, the manifest file is reproduced at another member of the replica set. The manifest file may be reproduced to the other replica set member by issuing a notice that the manifest file has been modified (or created) at the first member. The other replica set member may optionally verify that the manifest file does not currently exist locally, and if not, may retrieve a copy of the manifest file from the first replica set member.

At block 803, in response to the manifest file being received, the other replica set member determines whether each resource identified in the manifest file exists locally. For example, the other replica set member may compare the manifest file to a database that identifies the resources stored at the other replica set member. For the purpose of this determination, a resource is considered present if the version number of the existing resource is equal to or greater than the version number identified in the manifest for the resource. Alternatively, identity of version numbers could be required.

If each resource identified in the manifest file does not exist locally, then, at block 804, the other replica set member delays finalizing an installation process or other use of the resources until each of the resources does exist locally. For example, the other replica set member may await notification that new resources have been received at the other replica set member, and re-compare the manifest file to the database of locally stored resources until all the resources have arrived. Alternatively, the other replica set member may periodically re-compare the manifest file to the database.

Eventually, all the resources arrive at the other replica set member (or a timeout occurs), and, at block 805, the other replica set member releases access to the resources or completes an installation process, such as by launching a script or application identified or included within the manifest file. In that way, a user or other process may access the resources as a group without fear that the group will operate in an unpredictable or unstable manner.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium on which is stored a data structure, the data structure comprising:

a first field identifying the data structure as a special data structure;

a second field identifying a plurality of resources, at least two of the plurality of resources being necessary for a proper functioning of the plurality of resources; and a third field identifying a launch-mode option for executing a particular resource within the plurality of resources, wherein, in response to determining that the data structure is a special data structure based on the information stored in the first field, a service determines whether each of the plurality of resources exists on the computer-readable medium, and if not, delays access to the plurality of resources.

2. The computer-readable medium of claim 1, wherein the data structure further comprises a third field identifying a security context in which the plurality of resources may function, the security context being similar to a security context associated with a creator of the data structure.

3. The computer-readable medium of claim 2, (wherein the service launches at least one of the plurality of resources identified in the second field in a process having the security context identified in the third field.

4. The computer-readable medium of claim 1, wherein the data structure is transmitted over a transmission medium from the computer-readable medium to another computer-readable medium having another instance of the service.

5. The computer-readable medium of claim 1, wherein the data structure further comprises a third data filed including a time at which the manifest file will expire.

6. The computer-readable medium of claim 5, wherein the expiration time identifies a time within which each of the plurality of resources must be available on the computer-readable medium.

7. The computer-readable medium of claim 1, wherein each resource in the plurality of resources includes a version identifier, and wherein the launch-mode option indicates that the particular resource should be executed if the version identifiers satisfy a selected criteria.

8. The computer-readable medium of claim 7, wherein the selected criteria indicates that the particular resource should be executed only if each version identifier associated with existing resources matches version identifiers specified in the data structure.

9. The computer-readable medium of claim 7, wherein the selected criteria indicates that the particular resource should be executed if each version identifier associated with existing resources is at least as current as version identifiers specified in the data structure.

10. The computer-readable medium of claim 7, wherein the selected criteria indicates that another resource, other than the particular resource, should be executed if a required condition is not met.

* * * * *